Nov. 27, 1934.    J. H. McFAUL    1,981,869
METHOD OF MAKING A CORRUGATED FASTENER
Filed Sept. 9, 1931    3 Sheets-Sheet 1
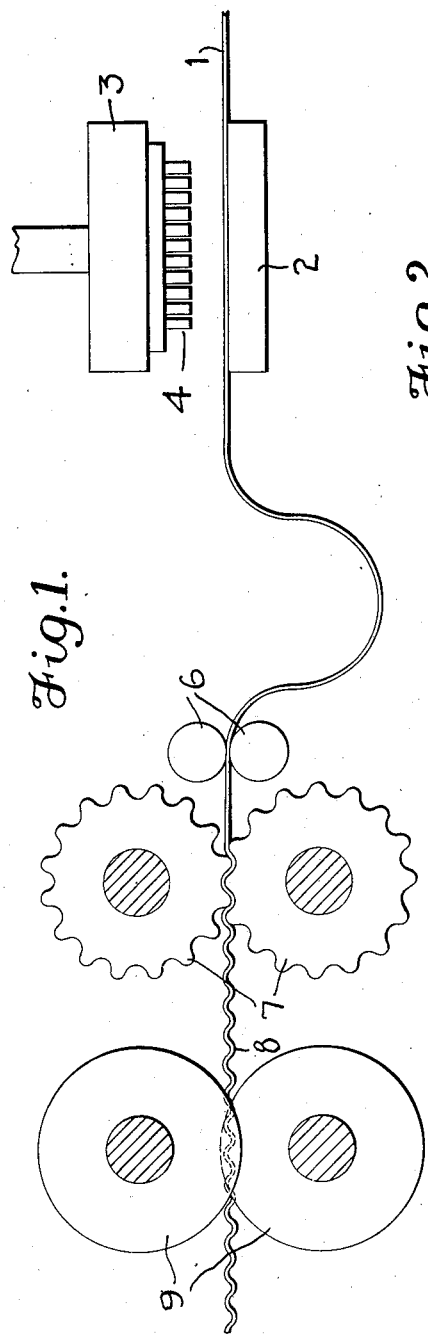
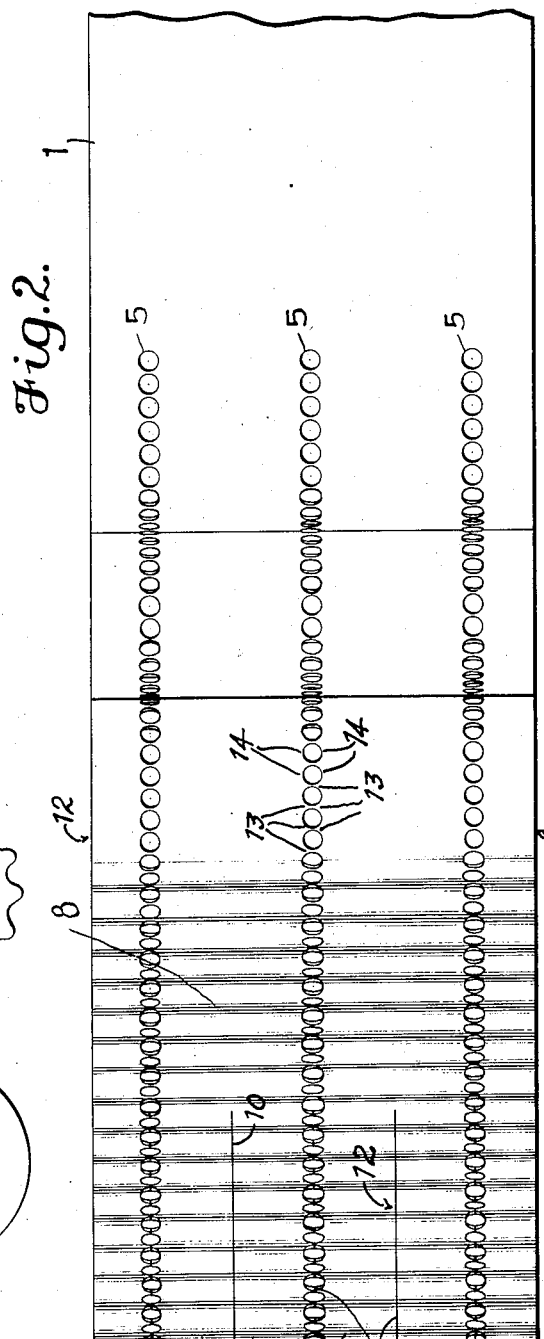
INVENTOR
Joseph H. McFaul
BY
Chas. McC. Chapman
ATTORNEY Nov. 27, 1934.   J. H. McFAUL   1,981,869
METHOD OF MAKING A CORRUGATED FASTENER
Filed Sept. 9, 1931   3 Sheets-Sheet 2
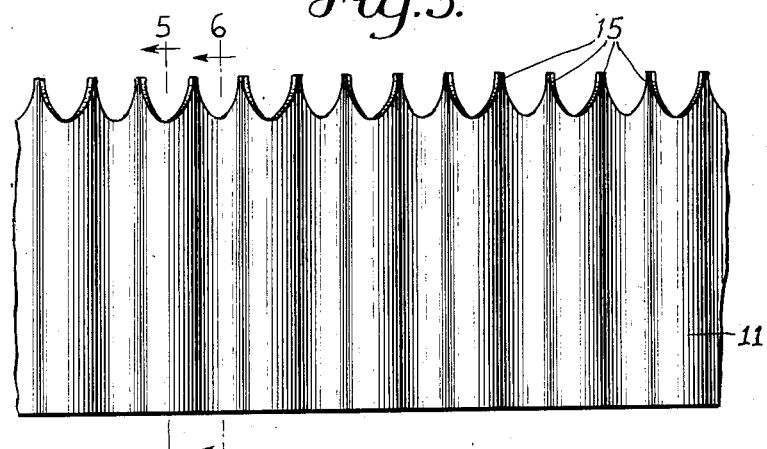
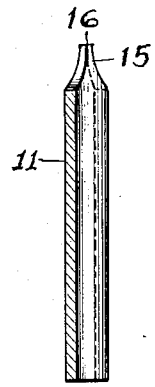 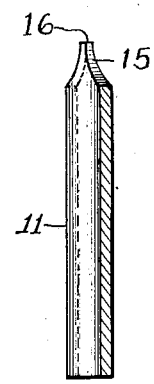
Inventor:
Joseph H. McFaul, Nov. 27, 1934.     J. H. McFAUL     1,981,869
METHOD OF MAKING A CORRUGATED FASTENER
Filed Sept. 9, 1931     3 Sheets-Sheet 3
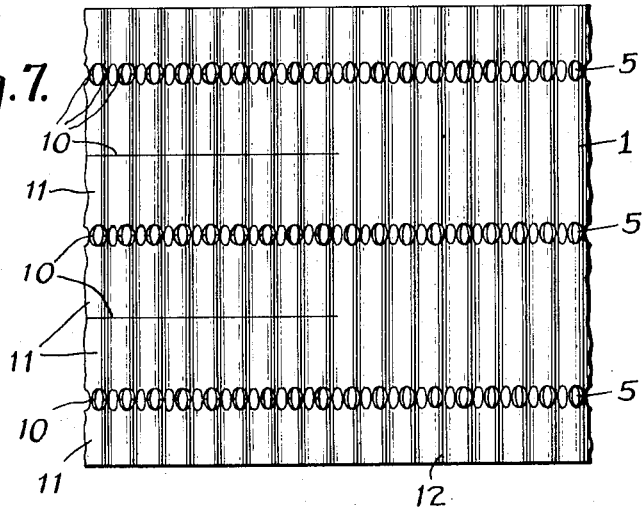
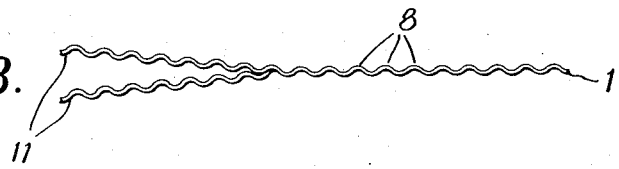
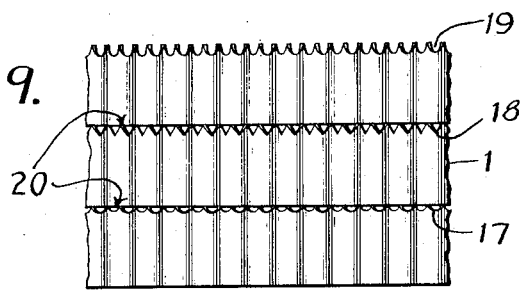

Patented Nov. 27, 1934

1,981,869

UNITED STATES PATENT OFFICE 1,981,869

METHOD OF MAKING A CORRUGATED FASTENER

Joseph H. McFaul, Queens Village, N. Y.

Application September 9, 1931, Serial No. 561,876

13 Claims. (Cl. 10—34)

This invention has to do with corrugated fasteners of the type used extensively in numerous branches of the woodworking industry.

One of the principal objects of the invention is to provide an improved method of manufacturing corrugated fasteners, which method is entirely practicable, permits of a much higher rate of production than any other method now in use, greatly reduces the cost of production, and at the same time results in a product which is different from, and better than, those produced by other methods.

Another important object is to provide an improved method of making a corrugated fastener, which fastener is characterized by a strong, easily penetrating, tack-like tooth formation, and is inexpensive to manufacture, and may be produced in multiple, several strips at a time, by the novel method above referred to.

While the foregoing statements are indicative in a general way of the nature of the invention, other objects and advantages will be apparent to those skilled in the art upon a full understanding of the improved method and the product thereof.

In order that the invention may be readily understood, one embodiment of the same is presented herein, but it will, of course, be appreciated that the invention is capable of being practiced or incorporated in other modified ways or forms coming equally within the scope of the appended claims.

In the accompanying drawings:

Figure 1 is a view in side elevation of a plurality of devices arranged in proper operative coordination for the purpose of demonstrating my method and the product thereof;

Figure 2 is a plan view of a strip of material from which multiplex fastener strips are produced and showing the features of my product, in one form, as the same are imposed upon the basic strip being treated, according to the steps of my method;

Figure 3 is an enlarged side view of a short length of corrugated fastener strip constructed in accordance with the invention;

Figure 4 is an edge view of the fastener shown in Figure 3;

Figure 5 is a view in transverse section taken through the fastener on the line 5—5 of Figure 3;

Figure 6 is a similar view, taken on line 6—6 of Figure 3;

Figure 7 is a face view of a section of the perforated and corrugated strip during the severing operation, showing part of the strip still uncut and the remainder severed to produce, in this instance, six corrugated fastener strips or ribbons, in readiness to be either wound into coils or to be cut into short lengths;

Figure 8 is an edge view of the partially severed multiple strip shown in Figure 7; and Figure 9 is a face or plan view of a section of a perforated and corrugated strip, displaying other modes of perforating the strip within the scope of my invention.

All of the corrugated fasteners on the market today are made by taking a flat sheet metal strip which is roughly the same width as the finished fastener, corrugating the strip, and then swaging, cutting or grinding off one edge at an angle from either one or both sides whereby to produce the usual, tapered side, saw-tooth formation. Some of the methods used by different manufacturers vary a little in the details having to do with the swaging, cutting or grinding operation, and several patents have been granted covering such variations, but otherwise all of the methods used are substantially the same.

The successive operations to be performed upon the strip of flat material may be brought about through the medium of any desired form of instrumentalities; but, in Figure 1, I have shown a series of implements arranged for successive operations upon the strip of flat material for producing the characteristic features of my finished multiplex strip, the individual nail strips and the nails or fasteners which may be severed from the strips. In Figure 1 the numeral 2 indicates a suitable support or feed table including the female member of a punch, the male member of which is indicated at 3. The male member, in its simplest form, is composed of a supporting head or block carrying a plurality of sets of punches 4 which, in this instance, are circular in form and adapted to produce a plurality of rows 5 of circular apertures. The material or flat strip 1 is fed or traversed over the bed 2 by any suitable means, and is fed by rolls 6 or other suitable means into the corrugating rolls 7. Preferably, the feeding means are located slightly in advance of the corrugating rollers 7, although this disposition of the feeding rolls is not to be taken as a limitation of my invention, the object being to provide means for positively feeding the strip of material to and relatively to the several instrumentalities utilized for my purposes at the proper speed ratio. The perforated strip, after leaving the punch press, will naturally sag a bit, between the press and the feed rollers, due to the weight of the material, this slack compensating for the difference in action of the punch and corrugating rollers.

The rollers 7 corrugate the perforated strip of material transversely of its length, and these corrugating rollers may have any desired form, since it may be found important, from time-to-time, to change the conformation of the corrugations according to the characteristics of the constituent strips and also of the fasteners. In order to form the corrugations 8 in proper position with respect to the perforations 5, some sort of means for effecting the desired registration would, of course, be needed. Obviously, the corrugating rollers 7 will also help in the feed of the material and in keeping the material straight during its progress relatively to the various instrumentalities used in my method and in the production of my multiplex nail strip. In Figure 2, the corrugations are shown at 8, and they are made to extend entirely across the strip 1.

The corrugated strip, after leaving the corrugating rollers 7, is then subjected to the action of shearing or cutting disks 9, which shear the material of the strip along the five lines indicated at 10. This results in severing the basic strip 1 into a plurality of strips 11, certain of the cutters operating through the center of the perforations 5, and certain others cutting directly through the unperforated body of the basic strip 1. When thus cut, the basic strip 1 is severed into six constituent nail strips of varying width, viz., the two outer strips being narrow, and the four inner strips being wider; but, all of approximately the same width. It will be understood, however, that variations of the widths of the individual nail strips can be made by altering the lateral spacing of the lines of apertures 5 and the lateral spacing of the cutting disks 9.

By cutting the basic strip as described, the characteristics of the constituent nail strips will be seen to be as follows: Each strip will have transverse corrugations 8, and one edge 12 of each strip will be smooth and will constitute the head of the fastener or nail, with which contact is made for driving, and the opposite edge of each strip will be provided with a plurality of points resulting from cutting through the apertures, the points being formed by the webs 13 connected by grooves 14. Thus, each of the six nail strips severed from the basic strip 1 has all the necessary and characteristic elements of an effective nail or fastener, and it remains only to sever the individual strips transversely into predetermined lengths, which may be varied at will for producing the individual nails or fasteners required.

The method of the present invention constitutes a radical departure from everything that is now being done along this line. Briefly, it consists in taking a flat sheet metal strip 1 which is preferably several times as wide as the finished fastener; punching holes 5 through the strip in parallel longitudinally extending rows, with the holes almost but not quite meeting each other; corrugating the perforated strip crosswise of the same, with the corrugations 8 so disposed with respect to the perforations 5 as to bring the narrow hourglass webs 13 between the perforations in substantially the median plane of the corrugated strip; and then finally severing the wide strip lengthwise into several narrow strips, with certain of the cuts 10 passing through the centers of the rows of holes and the remaining cuts spaced either evenly or unevenly from the holes depending upon whether the same or different sized fasteners are desired from the same blank.

By this method, not only one but several corrugated fastener strips 11, of the same or of different widths, are progressively produced at the same time, and, furthermore, each of such fasteners receives a saw-tooth formation of distinctly novel and improved design. Upon leaving the cutters, the strips 11 may be wound into separate coils, ready for shipment, or they may be cut transversely into short lengths and packaged like nails.

One of the finished strips 11 is shown in enlarged detail in Figures 3 to 6, inclusive. When a corrugated fastener is produced in accordance with this invention, a very strong, easily penetrating, sharp, tapering, square-cornered tooth formation 15 is obtained. As will be observed, the tip 16 of each tooth has four sharp corners, like a tack, and is disposed parallel with respect to the median horizontal plane of the fastener. If desired, the two diagonally opposed corners at the opposite sides of the median plane may be ground off slightly on a bevel by a supplemental grinding operation in order to make the extremity of the tip chisen-shaped in the median plane; but, the fastener will penetrate very effectively, however, without being subjected to this additional operation.

As the result of my invention, I have produced three important commercial products, viz., a multiplex fastener or nail strip resulting from perforating and corrugating (without cutting) a basic strip of plain, flat material of indefinite length and predetermined width; a plurality of individual nail strips having all the characteristics of the nails or fasteners desired; and a corrugated nail of any desired length resulting from the nail strip 11 being severed transversely into individual fasteners or nails of varying lengths or size as required. In other words, my product may be three-fold as the result of my method, viz., (1) a basic, multiplex nail strip provided with lines of perforations in parallelism running longitudinally of the basic strip and having transverse, parallel corrugations extending at a right-angle to the lines of perforations, and this basic multiplex nail strip may be sold as an article of manufacture without severing it into its constituent parts, this operation being left to the purchaser and user of the basic multiplex strip; (2) a nail strip, or plurality of nail strips having all the characteristics of the individual nails or fasteners to be severed therefrom, such characteristics including one smooth edge and the opposite edge having sharp points and reentrant grooves producing the penetrating edge or point of the fastener or nail which is corrugated transversely; and (3) corrugated nails of varying lengths cut from the nail strips by severing the latter transversely. My nail strips 11 are of such form that it is immaterial at what points, or on what lines, the same are cut in forming the individual nails or fasteners.

It will be understood that the instrumentalities shown in Figure 1 are illustrative, merely, of a means by which my product may be produced and the method of making the same may be carried out. It will also be understood that I am not to be limited to the form of the apertures nor the conformation of the corrugations, both of which may be varied as desired. And it will be seen that, if the perforations of the basic strip are circular, the points will be short, and that, if the perforations are elliptical or elongated, the points will be longer and the reentrant grooves deeper. It will also be understood that the corrugations may be angular rather than curved or sinuous, and that the cutting of the basic strip longitudinally, as well as the cutting of the constituent nail strips transversely, may be left to the purchaser or user. None of these features is to be taken as a limitation of my invention.

The perforations 5 are shown as circular, but they, of course, may be made oval or diamond-shaped. The corrugations 8 are shown as rounded; but, they may be made V-shaped or even square-cornered. The shape of the finished teeth 15 will depend on the shape of the perforations and also to some extent on the shape of the corrugations.

To demonstrate some of these points, I have shown in Figure 9 a section of a flat strip of material, of indefinite length and predetermined width, provided with various forms of perforations produced by dies or punches of different shapes, and the basic strip 1 is treated so as to primarily produce the nail strips in unit form rather than in duplex form, as shown in Figures 2 and 7. That is to say, the nail strips may be formed point-to-base, rather than point-to-point and base-to-base as in Figures 2 and 7. This method of treating the basic strip 1 enables various different types of nail-strips and nails to be produced at one time. In Figure 9, the basic strip 1 is shown punched, at one operation, with several different forms of apertures and marginal notches. The apertures 17 are semi-circular; the apertures 18 are V-shaped or angular; and the marginal notches 19 are semi-elliptical. The lines of cut, are indicated at 20; and the resulting nail strips are all different at their penetrating edge. Thus, a variety of nail strips may be produced at a single operation with great facility and economically.

An important feature of my invention resides in the omission of all grinding operations, it being unnecessary, due to the mode of treatment of the basic strip, to employ grinders for any purpose in the production of the individual nail strip or the individual nails. This simplifies the process and the product and results in the economic and rapid production of the nails and the strips from which they are produced.

What I claim and desire to secure by Letters Patent is:

1. The method of making corrugated fasteners of the saw-toothed type, which consists in perforating a flat strip of sheet metal lengthwise along parallel lines thus partially forming the teeth in the strip while the latter is still in a flat condition, then corrugating the strip transversely, slitting the strip lengthwise between lines of perforations, and then slitting the strips along the lines of perforations.

2. The method of making corrugated fasteners of the saw-toothed type, which consists in perforating a flat strip of sheet metal thus cutting the shape of the teeth in the strip while the latter is still in a flat condition, then corrugating the strip transversely and slitting the strip lengthwise along the line of perforations.

3. The method of making corrugated fasteners of the saw-toothed type, which consists in perforating a flat strip of sheet metal thus forming the teeth in the strip while the latter is still in a flat condition, then corrugating the strip transversely of the perforations so as to position the tips of the teeth in substantially the median plane of the fastener, and then slitting the strip along the lines of perforations.

4. The method of making corrugated fasteners of the saw-toothed type, which consists in treating a flat strip of sheet metal which is at least twice the width of the finished fastener, by perforating the strip longitudinally centrally, corrugating the strip transversely, and then cutting the strip longitudinally along the perforations, whereby to produce progressively at the same time at least two corrugated fastener strips.

5. The method of making corrugated fasteners of the saw-toothed type, which consists in treating a flat strip of sheet metal which is several times as wide as the finished fastener, by perforating the strip longitudinally in a number of parallel rows, corrugating the strip transversely, and then cutting the strip longitudinally along the perforations and also along lines intermediate the rows of perforations, whereby to produce progressively at the same time several corrugated fastener strips.

6. The method of making corrugated fasteners of the saw-toothed type, which consists in taking a flat strip of sheet metal which is several times as wide as the finished fastener, by perforating the strip longitudinally in a number of parallel rows, corrugating the strip transversely in such a way as to position the centers of the connecting webs between the perforations in substantially the median line of the fastener, and then cutting the strip longitudinally along the perforations and also along lines intermediate the rows of perforations, whereby to produce progressively at the same time several corrugated fastener strips.

7. The method described of producing a multiplex nail strip comprising producing in the strip parallel lines of perforations, corrugating the strip transversely to its length and its perforations and then cutting the strip centrally along the lines of perforations into constituent nail strips.

8. The method described of producing a basic multiplex nail strip comprising perforating the strip along parallel lines, and corrugating the strip at an angle to the lines of perforations, and then cutting the strip lengthwise between lines of perforations into constituent nail strips, and then slitting the strips along the lines of the perforations.

9. The method of producing corrugated nails comprising perforating a flat strip of material along parallel lines, corrugating the strip at an angle to the lines of perforations, severing the strip on a plurality of parallel lines some of which pass through the perforations, and dividing the strip thus produced into individual nails.

10. The method described of producing a multiplex nail strip comprising producing in the strip parallel lines of circular perforations, corrugating the strip transversely to its length, and then cutting the strip along the lines of perforations into constituent nail strips.

11. The method described of producing a multiplex nail strip comprising producing in the strip parallel lines of circular perforations arranged in close contiguity, corrugating the strip transversely to its length so as to cause each crown of the corrugations to contain the web between contiguous perforations, and then cutting the strip along the lines of perforations and webs between the same into constituent nail strips.

12. The method of making multiplex nail strips consisting in perforating a basic strip of plain, flat material along parallel lines, then corrugating said strip transversely at an angle to the lines of perforations, the said corrugations being so disposed relatively to the perforations as to include between the latter narrow webs of the basic material.

13. The method of making multiplex nail strips consisting in producing a basic strip of flat material of indefinite length and predetermined width and perforating the same lengthwise in parallel lines, and then corrugating the said strip transversely at an angle to and across the lines of perforations so as to include between the latter narrow webs of the basic material.

JOSEPH H. McFAUL.